United States Patent [19]

Rees et al.

[11] Patent Number: 6,001,143
[45] Date of Patent: Dec. 14, 1999

[54] METHOD OF FORMING CHEMICALLY BONDED AGGLOMERATES

[76] Inventors: Geraint Rees, 54 Rhoboth Rd., Llanelli Carmarthenshire SA 15 5DJ; Alan J. Leitch, 5, Mavis Bank, Kinross, KY13 7QR; Ronald J. Steward, 15, Quebec Rd., Norfolk, NR19 2OR, all of United Kingdom

[21] Appl. No.: 08/973,698

[22] PCT Filed: Jun. 18, 1996

[86] PCT No.: PCT/GB96/01446

§ 371 Date: Dec. 8, 1997

§ 102(e) Date: Dec. 8, 1997

[87] PCT Pub. No.: WO97/00307

PCT Pub. Date: Jan. 3, 1997

[30] Foreign Application Priority Data

Jun. 19, 1995 [GB] United Kingdom .................. 9512433

[51] Int. Cl.⁶ ........................... B29C 67/02; B29C 67/24
[52] U.S. Cl. ................................. 44/552; 44/578; 44/580; 44/589; 264/109; 264/123
[58] Field of Search .............................. 44/552, 577, 578, 44/580, 589; 264/109, 117, 123

[56] References Cited

U.S. PATENT DOCUMENTS

| | | | |
|---|---|---|---|
| 4,284,413 | 8/1981 | Capes et al. | 44/51 |
| 4,692,167 | 9/1987 | Levasseur | 264/37 |
| 4,849,021 | 7/1989 | Nakai et al. | 44/591 |
| 5,125,931 | 6/1992 | Schulz | 44/552 |
| 5,238,629 | 8/1993 | Davidson | 264/123 |

*Primary Examiner*—Angela Ortiz
*Attorney, Agent, or Firm*—Klima & Pezzlo, P.C.

[57] ABSTRACT

Thermally shock-resistant chemically bonded agglomerates suitable for use as a combustible fuel or in a gasification process are produced by:

(a) mixing particulate organic material comprising particulate carbonaceous fuel and/or animal excrement (such as dewatered comminuted sewage sludge) with a lignosulfonate, in the presence of water, with application of heat sufficient to maintain the lignosulfonate in fluid form, so as to deposit a film of lignosulfonate over the surface of the particulate material;

(b) oxidatively conditioning the lignosulfonate coated particulate material under conditions permitting escape of water present in the mixed particulate material, the conditioning either being in the presence of calcium ions or being followed by mixing the conditioned particulate material with lime; and (c) shaping the resulting free-flowing plastic mixture under pressure, to form the thermally shock-resistant agglomerates.

12 Claims, No Drawings

METHOD OF FORMING CHEMICALLY BONDED AGGLOMERATES

BACKGROUND OF THE INVENTION

The present invention is concerned with agglomerates obtained from organic waste (such as sewage sludge solids or refuse derived fuel), which are suitable for use in a gasification process or as a combustible fuel for use in a boiler or the like.

Sewage sludge is the insoluble part of raw sewage, which may be present in the residue left after aerobic or anaerobic treatment of sewage; current methods of disposal of sewage sludge include landfill and dumping at sea, neither of which is satisfactory from an environmental point of view. Difficulties are encountered with incineration of sewage sludge, because of the high water content of sewage sludge, the presence of toxic heavy metals, and the fact that safe incineration would require flame temperatures in the region of plasma temperatures.

However, various processes have been recently proposed for the production of fuel gas from waste materials, including sewage sludge. Typical such processes, for example, as disclosed in U.S. Pat. No. 5,125,931 and WO94/17161, involve mixing dewatered sewage sludge with crushed coal and comminuted cellulosic waste solids in defined ratios and water contents, pressing the resulting mixture into briquettes or pellets, and gasifying the briquette by reaction with oxygen and steam to produce a mixture of hydrogen and carbon monoxide.

Among the binders disclosed for such briquettes are molasses, black liquor, lignin sulfonate derivatives, brewery wastes, starch wastes, bentonite, slaked lime, unslaked lime, bitumen and pitch. No indication of preference is given for any of these binders, and no conditions are given for use of these binders.

Briquettes based on organic waste materials, such as those described above, may be gasified to produce a fuel gas, which can be burnt in a gas turbine, followed by exhaust gas recovery to generate steam, which in turn can be used to drive a steam turbine, both turbines being connected to generators to generate electricity.

For satisfactory commercial use in such a gasification process, the briquettes must meet the following criteria:
(a) they must have sufficient physical strength (cold green strength), in terms of crush strength, shatter resistance and abrasion/attrition resistance, for them to survive transportation, handling and feeding to the gasification process without disintegrating;
(b) they must maintain their structural integrity in the gasifier as they flow down the fuel bed under gravity (that is, they should not disintegrate or form dust as they pass through the various reaction zones of the gasifier, including the drying, devolatilisation, pyrolysis and gasification zones);
(c) they should be resistant to thermal shock (that is, they should be capable of withstanding instantaneous exposure to high temperatures, which, for demonstration purposes, may be those in an oven at about 800 degrees Celsius, without disintegration or significant loss of structural integrity);
(d) they should have good carbonization properties, that is, they should be amenable to gasification;
(e) they should not stick together, in order to avoid blocking of the gas flow and to ensure maintenance of bed voidage (the inherent porosity of the briquettes themselves is also helpful in the various reactions they undergo in the gasifier); and
(f) in the case of a slagging gasifier, the ash content should form a molten slag pool, which can be tapped intermittently and quenched to give a solid vitreous frit which encapsulates the heavy metals and the like.

The above criteria must be met within the financial constraints of a commercially viable process.

We have now devised a method of making improved briquettes and other agglomerates, which involves the use of a specially selected class of binder, such that the resulting agglomerates readily meet the above criteria, and are selectively suitable either for use in a gasification process as described above, or in a combustion process.

DETAILED DESCRIPTION OF THE INVENTION

According to the present invention, there is provided a method of forming thermally shock-resistant agglomerates each comprising a chemically bonded macromolecular structure, which method comprises:
(a) mixing particulate organic material comprising a carbonaceous particulate fuel and/or animal excrement with a lignosulfonate, in the presence of water, with application of heat sufficient to maintain the lignosulfonate in fluid form, so as to deposit a film of lignosulfonate over the surface of the particulate material;
(b) conditioning the lignosulfonate coated particulate material with oxygen (for example, in an atmosphere of air) under conditions permitting escape of water present in the mixed particulate material, said conditioning either being in the presence of calcium ions or being followed by mixing the conditioned particulate material with lime (calcium oxide or calcium hydroxide); and
(c) shaping the resulting free-flowing plastic mixture under pressure, to form agglomerates.

The resulting agglomerates have a polymerised or macromolecular (pseudo coal-like) structure with excellent carbonization properties and thermal shock resistance.

It is known that phenol has reaction properties which affect the carbonization properties of coal. Lignin contains substituted phenol units and has similar beneficial properties on the carbonization properties of coal or the like.

It is believed that the thermal shock resistance of the agglomerates is beneficially associated with the formation of sulfonyl and sulfur bridges between the macromolecular (lignin-based) backbones. Calcium sulfate formed from the calcium ions present is also believed to beneficially contribute to such thermal shock resistance. The sulfur present in the resulting agglomerates is stoichiometrically bonded in such a form that disadvantageous evolution of oxides of sulfur, or other noxious sulfur compounds, is substantially precluded.

If the lignosulfonate is permitted to react with urea or a urea derivative, this may contribute to the plasticity of the resulting mix; it is particularly preferred to supply urea or such a urea derivative by using (according to a preferred embodiment of the invention), sewage sludge as the animal excrement. This reaction of lignin with urea or urea derivatives is a reaction which is known per se.

When sewage sludge is used, it is preferably initially screened and dewatered, typically to a water content of less than about 70% by weight (or a solids content of greater than 30% by weight). Other possible types of animal excrement which may be used according to the invention include pig slurry, which is also preferably dewatered to a solids content such as that described above with reference to sewage sludge.

The use in the method according to the invention of a lignosulfonate, which is a material typically produced as a by-product in a paper-making process, results in agglomerates of exceptional strength, as evidenced by their substantial resistance to impact, attrition and thermal shock.

The lignosulfonate is preferably present in a minor amount, such as up to about 15% by weight, of the mix used to form agglomerates, the amount referred to relating to lignosulfonate in aqueous form.

The major influence on the mechanical properties of agglomerates, such as briquettes, is the bonding between particles. On heating, carbonization, combustion or gasification of agglomerates formed according to the invention, the chemical bonding between the particles extends through the structure of the particles, thereby establishing a metamorphic change throughout the agglomerate molecular structure. The nature of this bonding is important not only under test conditions, but also under service conditions.

If the bonding were to be of a purely adhesive nature, there would be a separate phase at the interfaces between particles; according to the invention, the bonding is chemical in nature and extends throughout the macromolecular structure of the agglomerate.

In the agglomerates produced according to the present invention, the particles of the organic particulate materials, generally comprising sewage sludge, become fused and chemically bonded to one another in such a manner that the particles and lignosulfonate binder no longer remain as distinct separate entities or separate phases, such that under gasification conditions, the whole agglomerate has high green strength and acts as a single homogeneous mass.

The lignosulfonate may be used in aqueous form, such as an aqueous solution. A preferred aqueous solution contains 40 to 60% by weight (on a dry basis) of the lignosulfonate. Alternatively, when the remainder of the mix is itself aqueous, the lignosulfonate may be in solid or pseudo-solid form.

The lignosulfonate may include any suitable cation; examples of suitable cations include ammonium, sodium, calcium and magnesium. Calcium lignosulfonate is preferred because of the advantageous thermal shock-resistance of the resulting agglomerates, and the ability of calcium lignosulfonate to polymerise to provide agglomerates with excellent green strength. Furthermore, when calcium lignosulfonate is used, it may not be necessary to treat the conditioned mix with lime, as there may already be sufficient calcium ions present.

It is particularly preferred that the lignosulfonate should be substantially sugar-free (sugars and the like having been removed, typically by fermentation or the like).

When lime (calcium oxide) is used, and/or when the lignosulfonate is in the form of the calcium salt, the calcium ions have several effects, as follows:

1. The calcium ions cause separation of lignosulfonate into α and β forms, which are defined according to the solubility of the lignin in a bisulfite solution. The a lignins produce lignosulfonates which are less heavily sulfonated than β lignins, and which are therefore more insoluble, when subjected to the same conditions. These more insoluble (less soluble) lignin/lignosulfonate complexes can be precipitated out.
2. Calcium oxide will, on being slaked to $Ca(OH)_2$, take up free moisture. This reaction is sometimes important in that it removes free water from the general green mix. Free water and thermal shock resistance are not compatible and the removal of water significantly improves the thermal shock resistance of the product.
3. Calcium will react with sulfur-containing compounds to produce $CaSO_4$. $CaSO_4$ in a melt situation (such as in a slagging gasifier) has beneficial effects on the viscosity of the actual melts themselves.
4. Calcium, in the presence of carbonate-forming materials, has a catalytic effect on various gasification reactions, resulting in an increased quantity of methane formed.

When a carbonaceous fuel is present in the mix used according to the invention, the ratio of sewage sludge to carbonaceous fuel may be, for example, in the range 0.25 to 2.5:1. In some preferred embodiments, the amount of sewage sludge is greater than that of the carbonaceous fuel (a preferred ratio being in the range 1.5 to 2.5:1), which enables high quality agglomerates to be obtained, from low grade starting materials so as to be suitable for supply to, for example, a gasification process. Gas resulting from such a gasification process appears to be cleaner than gas from a conventional gasification process.

When sewage sludge is used, it should, as indicated above, be dewatered, and preferably also dried, prior to mixing with the lignosulfonate, typically to a water content of 10% by weight or less. The sewage sludge and (where used) the carbonaceous fuel are in particulate form, typically in the form of short fibres, flock, flakes, powder, granules or the like with a mean particle size of not more than 10 mm, more preferably not more than 6 mm.

The agglomerate mix used according to the invention is preferably, in at least some embodiments of the invention, substantially free of refuse-derived fuel or other materials derived from municipal refuse. Refuse-derived fuel can, in some cases, detract from the properties, such as the physical strength and thermal shock resistance, of the resulting agglomerates.

When a carbonaceous fuel is used in the agglomerates according to the invention, the fuel may be any suitable particulate material, such as refuse-derived fuel, petroleum coke, anthracite, bituminous or sub-bituminous coal, coke (from coal), coking coal, peat or lignite. The fuel typically has a particle size in the range indicated above for the sewage sludge; a preferred particle size for the carbonaceous fuel is not more than 2 mm.

When lime is used in the method according to the invention, it is typically in the form of the oxide (which is preferred when the mix has a relatively high water content, such as about 5% by weight or more), or, in some cases, in the form of the hydroxide (slaked lime).

The agglomerates can be shaped into, for example, briquettes (formed between shaped dies or the like), pellets, similar bodies formed by extrusion, pan agglomeration or the like. The mix may be shaped to agglomerates by any suitable means, such as for example, in a ring-roll press. The briquettes are preferably of the pillow-shaped type.

It is a particular advantage of the present invention that highly thermal shock-resistant agglomerates can be formed. Such agglomerates are substantially dry and can be used in a process involving gasification with oxygen, such as in a British Gas/Lurgi Slagging Gasifier, which is a high pressure, fixed bed, oxygen-blown, slagging gasifier, where fuel (lump coal or briquettes) is fed to the top of a gasification bed via a lock hopper system. As the fuel sinks through the bed, it is successively dried, devolatilised, pyrolysed, gasified and combusted. Oxygen and steam, in a suitable predetermined ratio, are injected into the gasification zone via nozzles (called tuyeres), which thereby ensures that the temperature is sufficiently high that ash and flux are melted so as to form a slag pool in the bottom of the gasification zone, which slag is drained intermittently and water quenched to form a benign frit. Much of the detail of the British Gas/Lurgi Slagging Gasifier is well known in the art, and is described in, for example, GB patent 977122 and other literature.

The present invention will be illustrated, by way of example only, by the following tabulated summary of results obtained with various formulations formed into briquettes by a method according to the invention.

Table 1 gives details of compositions of briquettes obtained according to the invention, together with the corresponding green and carbonised crush strengths of the briquettes (measured using a pneumatic briquette crushing test rig). Each briquette tested contained calcium lignosulfonate (Ligno) as binder; the percentages and ratios quoted in the column entitled "Composition of Organic Material" relate to the organic material (that is, all the organic ingredients other than the lignosulfonate). The sludge used was sewage sludge which had been dried at at least 105 degrees Celsius to a residual moisture content of 1 to 2.5% by weight. "Pitts. No 8 Coal" means Pittsburgh No. 8 Coal; "Pet. Coke" means petroleum coke.

In each case, the sludge and/or other organic material was mixed with the aqueous calcium lignosulfonate, heated and oxidatively conditioned, and then shaped to pillow-shaped briquettes. "Lime before Ligno" means that calcium oxide was added before the lignosulfonate; "Lime after Ligno" means that calcium oxide was added after the lignosulfonate.

Table 2 gives details of the weight changes attained for individual briquettes after they had undergone carbonisation in an oven in an inert atmosphere, where the temperature was increased from around ambient room temperature to about 800 degrees Celsius over a period of about one hour. The briquettes measured were the corresponding ones identified in Table 1.

TABLE 1

| Example | Composition of Organic Material | Briquette Composition | | | | | Crush Strength kgf | |
|---|---|---|---|---|---|---|---|---|
| | | Sludge gm | Pitts. No. 8 Coal gm | Pet. Coke gm | Binder gm | Lime CaO gm | Green | Carbonised |
| 1 | 100% dried sludge | 70 | — | — | 9 | — | 198 | 36 |
| 2 | 100% dried sludge. Lime before Ligno | 70 | — | — | 9 | 1 | 162 | 27 |
| 3 | 100% dried sludge. Lime after Ligno | 70 | — | — | 9 | 1 | 171 | 45 |
| 4 | 100% Pitts No. 8 Coal | — | 70 | — | 12 | — | 144 | * |
| 5 | 100% Pitts No. 8 Coal. Lime before Ligno | — | 70 | — | 12 | 1 | 108 | * |
| 6 | 100% Pitts No. 8 Coal. Lime after Ligno | — | 70 | — | 12 | 1 | 126 | * |
| 7 | 100% Pet. Coke | — | — | 70 | 12 | — | 216 | 122 |
| 8 | 2:1 Sludge/Pitts No. 8 Coal | 44 | 22 | — | 7 | — | 126 | 115 |
| 9 | 2:1 Sludge/Pitts No. 8 Coal. Lime before Ligno | 44 | 22 | — | 7 | 1 | 171 | 68 |
| 10 | 2:1 Sludge/Pitts No. 8 Coal. Lime after Ligno | 44 | 22 | — | 7 | 1 | 144 | 101 |
| 11 | 1:1 Sludge/Pitts No. 8 Coal | 36 | 36 | — | 8 | — | 153 | 117 |
| 12 | 1:1 Sludge/Pitts No. 8 Coal. Lime before Ligno | 36 | 36 | — | 8 | 1 | 144 | 99 |
| 13 | 1:1 Sludge/Pitts No. 8 Coal. Lime after Ligno | 36 | 36 | — | 8 | 1 | 171 | 95 |
| 14 | 2:1 Sludge/Pet. Coke | 44 | — | 22 | 7 | — | 153 | 22 |
| 15 | 2:1 Sludge/Pet. Coke. Lime before Ligno | 44 | — | 22 | 7 | 1 | 162 | 16 |
| 16 | 1:1 Sludge/Pet. Coke | 36 | — | 36 | 8 | — | 135 | 22 |
| 17 | 1:1 Sludge/Pet. Coke. Lime before Ligno | 36 | — | 36 | 8 | 1 | 135 | 20 |

TABLE 2

| Example | Composition | Initial Weight gm | Final Weight gm | Weight Loss gm | Weight Loss % |
|---|---|---|---|---|---|
| 1 | 100% dried sludge | 42.7 | 17.0 | 25.7 | 59.3 |
| 2 | 100% dried sludge. Lime before Ligno | 41.2 | 17.1 | 24.1 | 58.5 |
| 3 | 100% dried sludge. Lime after Ligno | 42.9 | 17.8 | 25.1 | 58.5 |
| 4 | 100% Pitts. No. 8 Coal | 49.7 | * | * | * |
| 5 | 100% Pitts. No. 8 Coal. Lime before Ligno | 53.7 | * | * | * |
| 6 | 100% Pitts. No. 8 Coal. Lime after Ligno | 51.1 | * | * | * |
| 7 | 100% Pet. Coke | 45.5 | 38.9 | 6.6 | 14.5 |
| 8 | 2:1 Sludge/Pitts. No. 8 Coal | 42.4 | 21.0 | 21.4 | 50.5 |
| 9 | 2:1 Sludge/Pitts. No. 8 Coal. Lime before Ligno | 40.9 | 20.6 | 20.3 | 49.6 |
| 10 | 2:1 Sludge/Pitts. No. 8 Coal. Lime after Ligno | 43.7 | 21.8 | 21.9 | 50.1 |
| 11 | 1:1 Sludge/Pitts. No. 8 Coal | 46.1 | 24.5 | 21.6 | 46.9 |
| 12 | 1:1 Sludge/Pitts. No. 8 Coal. Lime before Ligno | 47.4 | 26.0 | 21.4 | 45.1 |
| 13 | 1:1 Sludge/Pitts. No. 8 Coal. Lime after Ligno | 47.5 | 26.5 | 21.0 | 44.2 |
| 14 | 2:1 Sludge/Pet. Coke | 44.0 | 23.6 | 20.4 | 46.4 |
| 15 | 2:1 Sludge/Pet. Coke. Lime before Ligno | 46.5 | 26.5 | 20.0 | 43.0 |
| 16 | 1:1 Sludge/Pet. Coke | 47.0 | 29.8 | 17.2 | 36.6 |
| 17 | 1:1 Sludge/Pet. Coke. Lime before Ligno | 48.2 | 32.2 | 16.0 | 33.2 |

We claim:

1. A method of forming thermally shock-resistant chemically bonded agglomerates suitable for use as a combustible fuel or in a gasification process, which method comprises:
   (a) mixing particulate organic material selected from the group consisting of a carbonaceous fuel and an animal excrement with a lignosulfonate, in the presence of water, with application of heat sufficient to maintain the lignosulfonate in fluid form, so as to deposit a film of lignosulfonate over the surface of the particulate material;
   (b) oxidatively conditioning the lignosulfonate coated particulate material in an atmosphere comprising oxygen under conditions permitting escape of water present in the mixed particulate material, said conditioning either being in the presence of calcium ions or being followed by mixing the conditioned particulate material with lime; and
   (c) shaping the resulting free-flowing plastic mixture under pressure, to form agglomerates.

2. A method according to claim 1, wherein the oxygen is in the form of air.

3. A method according to claim 1, wherein the lime is in the form of the hydroxide and the lignosulfonate has a water content of less than 5% by weight.

4. A method according to claim 1, wherein the lignosulfonate is an ammonium, sodium, calcium or magnesium salt.

5. A method according to claim 4, wherein the salt is calcium lignosulfonate.

6. A method according to claim 1, wherein the lignosulfonate is substantially sugar-free.

7. A method according to claim 1, wherein the lignosulfonate is used in an aqueous form containing 40–60% dry weight of said lignosulfonate.

8. A method according to claim 1, wherein the animal excrement comprises dewatered sewage sludge.

9. A method according to claim 8, wherein the sewage sludge is dewatered and dried to a water content of not more than 10% by weight and is in the form of fibres, flakes, powder or granules with a particle size of not more than 10 mm.

10. A method according to claim 1, wherein the weight ratio of said animal excrement to said carbonaceous fuel is within the range 0.25 to 2.5:1.

11. A method according to claim 1, wherein the carbonaceous fuel comprises refuse-derived fuel, petroleum coke, anthracite, bituminous or sub-bituminous coal, coke from coal, coking coal, peat or lignite, all with a maximum particle size of 10 mm.

12. A method according to claim 1, wherein the mix is substantially free of municipal solid waste.

* * * * *